United States Patent [19]
Acuff et al.

[11] Patent Number: 5,171,457
[45] Date of Patent: Dec. 15, 1992

[54] METHOD OF HANDLING WET COFFEE GROUNDS IN FILTER CUPS

[75] Inventors: Pamela A. Acuff, 32 South St., Baltimore, Md. 21202; Michael N. Krasney, Annapolis, Md.

[73] Assignee: Pamela A. Acuff, Baltimore, Md.

[21] Appl. No.: 727,921

[22] Filed: Jul. 10, 1991

[51] Int. Cl.$^5$ .......................................... B01D 29/085
[52] U.S. Cl. .................................. 210/800; 210/474; 210/477; 210/482; 99/298; 426/81; 426/83
[58] Field of Search ............... 426/77, 81, 83; 99/298; 210/350, 474, 477, 478, 481, 482, 493.5, 767, 768, 800

[56] References Cited

U.S. PATENT DOCUMENTS

| | | | |
|---|---|---|---|
| 1,310,796 | 7/1919 | Hirshhorn | 426/81 |
| 1,535,533 | 4/1925 | Lefrak | 426/81 |
| 1,947,523 | 2/1934 | Hirshhorn | 426/83 |
| 2,147,831 | 2/1939 | Doble | 426/81 |
| 2,460,735 | 2/1949 | Carroll | 426/81 |
| 3,833,125 | 9/1974 | Schwartz . | |
| 4,278,691 | 7/1981 | Donarumma et al. | 426/83 |
| 4,584,101 | 4/1986 | Kataoka | 426/81 |
| 4,680,185 | 7/1987 | Illk | 426/83 |
| 4,728,425 | 3/1988 | Sandvig . | |
| 4,859,337 | 9/1989 | Woltermann . | |
| 4,981,588 | 1/1991 | Poulallion . | |

FOREIGN PATENT DOCUMENTS 177440   5/1935   Fed. Rep. of Germany ........ 426/83

Primary Examiner—Robert A. Dawson
Assistant Examiner—W. L. Millard
Attorney, Agent, or Firm—Laurence R. Brown

[57] ABSTRACT

This invention solves the problem of disposal of used coffee membrane filters and wet coffee grounds neatly with decreased probabilities of spilling coffee grounds on the floor, table or dumping them loose in a trash container. Thus, several embodiments provide different ways to close and secure the open top of the filter membrane after insertion of coffee grounds into the filter for making coffee, thereby to provide a closed unit that can be disposed of without spilling the beans. Thus, drawstrings or adhesive tabs may be provided in the rim of the filters for closure, or additional flaps or cover sheets may be attached to the rim of the filter to close the open filter mouth.

1 Claim, 3 Drawing Sheets

METHOD OF HANDLING WET COFFEE GROUNDS IN FILTER CUPS

TECHNICAL FIELD

This invention relates to coffee makers, and more particularly it relates to cup and cone-shaped membrane coffee filters, and the like.

BACKGROUND ART

Membrane type coffee filters for drip through type coffee makers are well known, as set forth in U.S. Pat. No. 4,728,425, L. G. Sandvig, Mar. 1, 1988, for example, showing a typical cuplike coffee container for receipt of an open top substantially cup shaped membrane, generally paper, coffee filter. There is a problem with such open top filters, which must be disposed of after use, in that it is easy to spill coffee grounds in removing the filter cup and wet coffee grounds. Also, when such used filters are disposed of in a trash container, the unconfined coffee grounds are messy and tend to create unsanitary conditions.

U.S. Pat. No. 4,859,337, E. H. Woltermann, Aug. 22, 1989 teaches sealed filter units already filled with coffee. However, such prefilled units are expensive and may not permit the consumer to choose a preferred brand or grind, etc.

U.S. Pat. No. 4,981,588, J. Poulallion, Jan. 1, 1991 provides for a filter for support in a teacup for preparing a single cup open top and provides the same disadvantages heretofore discussed regarding disposal.

U.S. Pat. No. 3,833,125 H. A. Schwartz shows coffee filter elements of different shapes that fit over coffee baskets for percolators with axial stems that conform to a fit over a stem. One substantially square shaped embodiment has holes in the corner for threading over the stem after coffee grounds are added to provide filter layers above and below the coffee. This assembly must be removed wet after use and is subject to handling and the problems of spilling of coffee grounds and disposal heretofore discussed.

There is no satisfactory way of dealing with disposal of the used coffee grounds in open top cup shaped membrane filters, or the equivalent such as used in stem type drip cage containers.

Accordingly it is an object of this invention to resolve the problems of removal and disposal of open cup type membrane coffee filters after use.

DISCLOSURE OF THE INVENTION

The removal and disposal of the membrane open top coffee filters in accordance with the methods and apparatus of this invention is facilitated without danger of spilling the grounds or loosening them into a trash container. This is achieved by closing and securing the top of the open-topped cup shaped filters to form a closed package of the grounds after they have been inserted in-situ into the filters at the coffee brewing site. Then the filter and bags are safely and conveniently removed and disposed of.

The closing and securing of the filters can be done in various ways, and the preferred embodiments of this invention include drawstrings and adhesive tabs to draw the cup upper rings together or cover sheets which are secured to the filters to form a closed compartment confining the grounds.

Other objects, features, and advantages of the invention will be found throughout the following description, claims and drawings.

THE PREFERRED EMBODIMENTS

Figure 1:
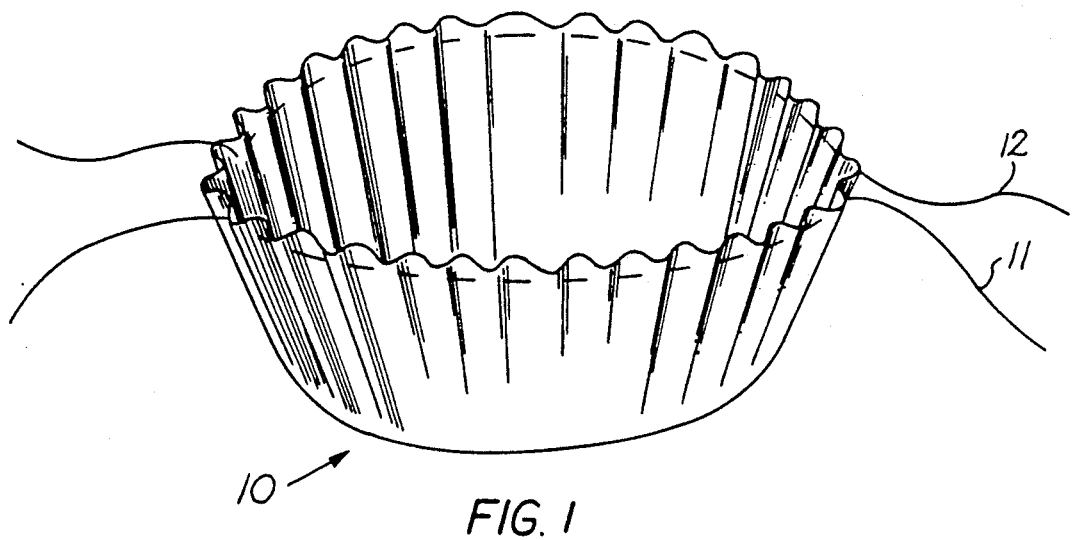
FIG. 1 is a perspective sketch of an open top membrane coffee filter provided with drawstrings in accordance with one embodiment of the invention.
Figure 2:
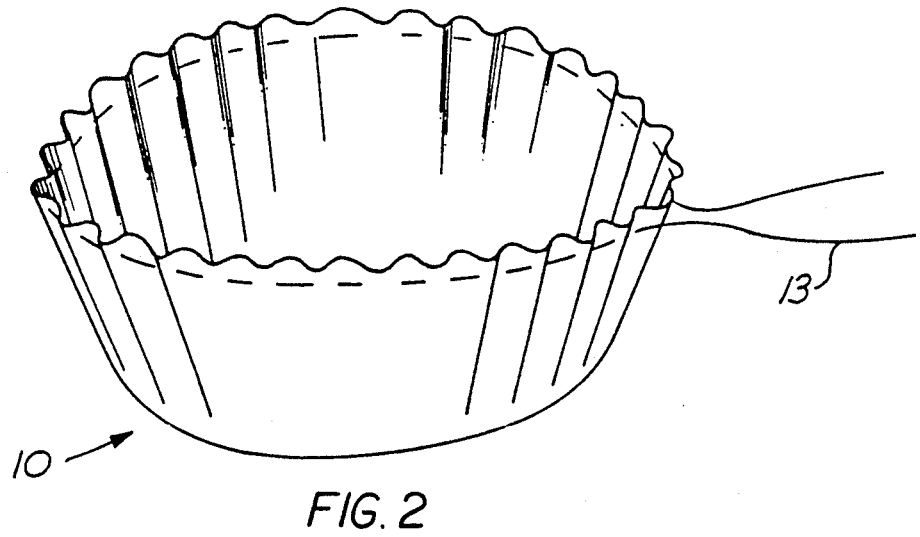
FIG. 2 is a perspective sketch of a modified filter-drawstring array with a single drawstring.
Figure 3:
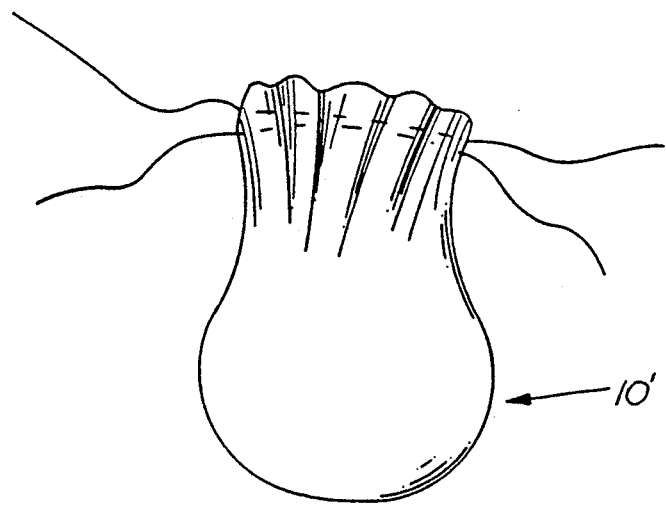
FIG. 3 is a side view sketch of the filter of FIG. 1 with drawstrings pulled to provide a closed container with coffee grounds inside.

A typical filter cup 10 formed from a round blank bellowed to form side walls is shown in FIG. 1 with a pair of drawstrings 11, 12 extending through the ruffles near the upper rim. The filter cup 10 of FIG. 2 has a single drawstring 13. Each of these bags when closed form the closed container 10' of FIG. 3. The drawstrings are closed after ground coffee is put into the open top filter at the coffee brewing site If desired a single cup serving size may be used in a cup similar to a teabag providing all the advantages of easy removal and disposal without losing or distributing the coffee grounds.

Figure 4:
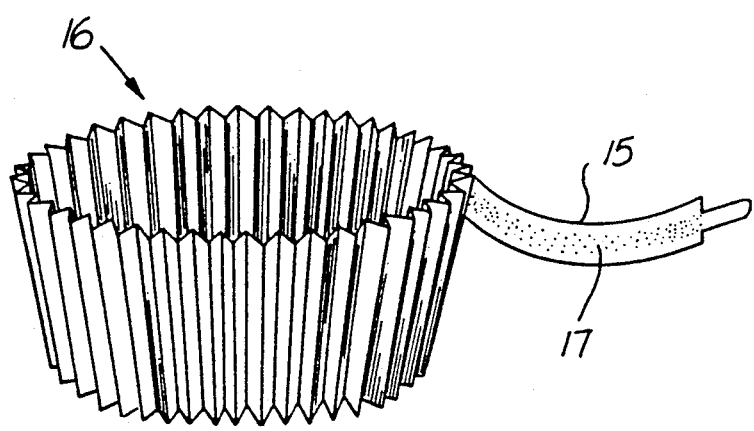
FIG. 4 is a perspective sketch of another embodiment of the invention with an adhesive closure tab.

In the embodiment of FIG. 4, the adhesive tab 15 is used to close and seal the filter cup open top 16 by adhering to the filter cup near its upper rim. Typically this is done after brewing, and normally only the bottom of the cup containing the grounds is wet and soggy so that the adhesive strip 15 may adhere to the filter membrane about the upper neck formed manually for closure and removal of the filter and used coffee grounds. The adhesive arts provide many choices of adhesives 17 used on such tabs, for use with special materials, wet or dry and for self adhesion to hold tightly closed.

Figure 5:
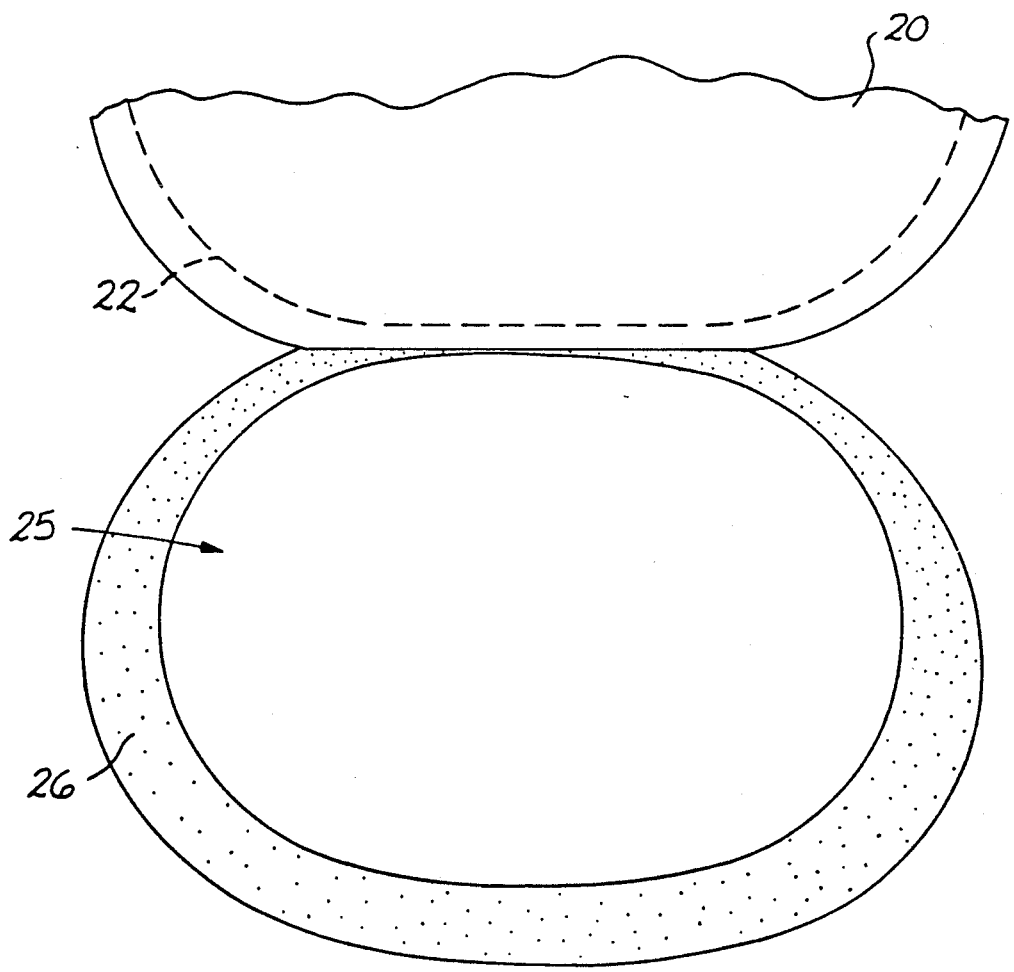
FIG. 5 is a plan view sketch, partly broken away of a coffee filter blank with an accompanying cover flap used for closure of the filter cup after coffee grounds are inserted.

In the embodiment of FIG. 5, the main filter cup body 20 of larger diameter can form a top rim outside the dotted border 22, and is integrally attached to the smaller diameter cup cover sheet 25, provided with adhesive about its rim 26 which is folded along dotted line 27 to form a cover sheet and thus a closed container of the filter cup. This can be done before brewing and after the coffee grounds are inserted because the filter material cover 25 is porous. A choice of many adhesives 26 is now available to tailor the construction with the filter materials and conditions of use.

Figure 6:
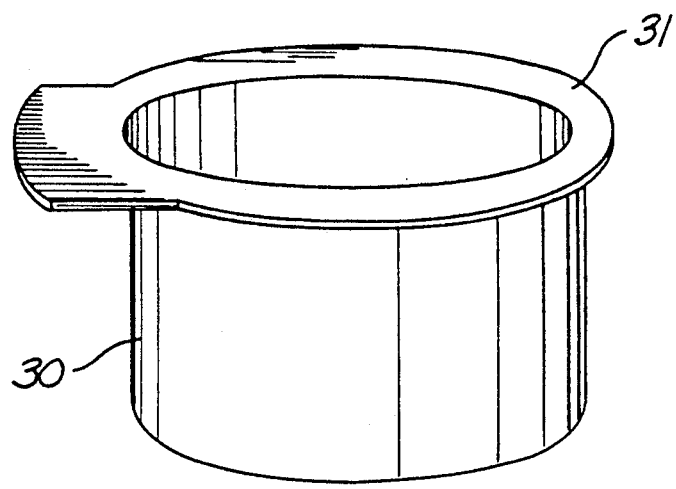
FIG. 6 is a perspective sketch of a typical drip coffee filter container cup used in a coffee maker.
Figure 7:
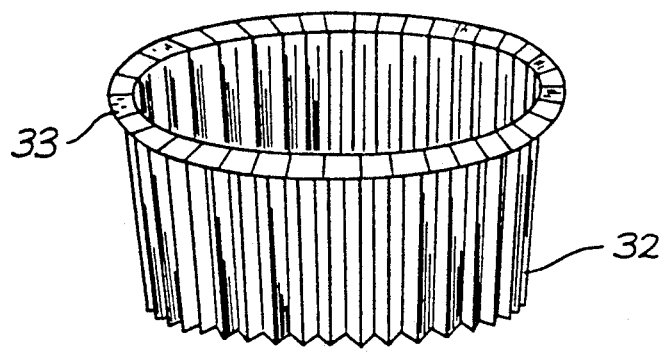
FIG. 7 is a perspective view of a coffee filter having a rim for registering with the rim of the container cup afforded in one embodiment of the invention.
Figure 8:
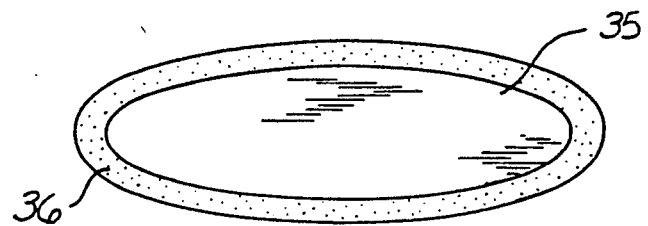
FIG. 8 is a cover sheet for the coffee filter of FIG. 7 bearing an adhesive ring for sealing to the top rim of the filter cup.

In FIG. 6 is shown a typical coffee maker drip coffee containing compartment 30 having a planar top rim 31. The open top filter cup 32 of FIG. 7 nests in the coffee container 30 with its laterally extending rim 33 mating onto rim 31. Separate cover sheets 35 may then be fitted and sealed on the top of the cup for forming a closed container either before or after brewing by means of the adhesive rim 36. The cover need not be of porous filter material if employed after brewing.

It has now become evident that the state of the art is improved by the means and methods of this invention for the treatment of coffee grounds in coffee makers permitting removal and disposal without mess or unwanted distribution of the grounds at the brewing site or in the trash container.

Accordingly those novel features descriptive of the nature and spirit of this invention are set forth in particularity in the following claims.

We claim:

1. The method of removing used open top cup shaped coffee membrane filters of the type fitting into open top cup shaped coffee maker receptacles through which water is passed through the open filter for brewing, for solving the problem of losing wet coffee grounds from the filter when removing it from the cuplike containers of the coffee maker after brewing comprising the steps of brewing coffee in the open top filter, closing and securing closed with a fastening member the open top of the filter membrane for retaining wet coffee grounds with the filter membrane resident in the coffee maker receptacle after brewing to form a substantially closed disposal unit configuration of the filter membrane, and removing said closed container and coffee grounds confined therein from the coffee maker receptacle for disposal.

* * * * *